(12) United States Patent
Zheng et al.

(10) Patent No.: US 11,914,178 B2
(45) Date of Patent: Feb. 27, 2024

(54) LIGHTING DEVICES FOR AUTOMATICALLY SWITCHING BETWEEN A VISIBLE LIGHT SOURCE AND AN INFRARED LIGHT SOURCE

(71) Applicant: ZHEJIANG DAHUA TECHNOLOGY CO., LTD., Zhejiang (CN)

(72) Inventors: Liyun Zheng, Hangzhou (CN); Hui Zhan, Hangzhou (CN); Yanhui Liu, Hangzhou (CN); Yubing Zhao, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 412 days.

(21) Appl. No.: 17/348,901

(22) Filed: Jun. 16, 2021

(65) Prior Publication Data
US 2021/0311233 A1  Oct. 7, 2021

Related U.S. Application Data

(63) Continuation of application No. PCT/CN2018/121621, filed on Dec. 17, 2018.

(51) Int. Cl.
*G02B 5/20* (2006.01)
*H04N 23/56* (2023.01)
*H04N 23/72* (2023.01)
*H04N 23/71* (2023.01)
*G02B 26/00* (2006.01)
(Continued)

(52) U.S. Cl.
CPC .............. *G02B 5/208* (2013.01); *G02B 7/006* (2013.01); *G02B 26/002* (2013.01); *G03B 11/00* (2013.01); *H04N 23/56* (2023.01); *H04N 23/71* (2023.01); *H04N 23/72* (2023.01)

(58) Field of Classification Search
CPC ...... G02B 26/002; G02B 5/208; G02B 7/006; G03B 11/00; H04N 23/56; H04N 23/71; H04N 23/72
USPC .......................................... 348/164
See application file for complete search history.

(56) References Cited

U.S. PATENT DOCUMENTS

2009/0052886 A1* 2/2009 Watanabe .......... H04N 1/00307
396/486
2010/0072351 A1* 3/2010 Mahowald ............ G01J 1/1626
250/214 AL
(Continued)

FOREIGN PATENT DOCUMENTS

| CN | 203133460 U | 8/2013 |
|---|---|---|
| CN | 203554767 U | 4/2014 |
| CN | 204460078 U | 7/2015 |
| CN | 105389571 A | 3/2016 |
| CN | 205563039 U | 9/2016 |

(Continued)

OTHER PUBLICATIONS

International Search Report in PCT/CN2018/121621 dated Sep. 18, 2019, 4 pages.

(Continued)

*Primary Examiner* — Kathleen M Walsh
(74) *Attorney, Agent, or Firm* — METIS IP LLC

(57) ABSTRACT

The present disclosure relates to a lighting device for automatically switching between a visible light source and an infrared light source. The lighting device may include a light source, an infrared filter, and a driving module for driving the infrared filter.

15 Claims, 13 Drawing Sheets

(51) Int. Cl.
*G03B 11/00* (2021.01)
*G02B 7/00* (2021.01)

(56) References Cited

U.S. PATENT DOCUMENTS

| | | | | |
|---|---|---|---|---|
| 2010/0134878 A1* | 6/2010 | Wu | ........................ | H04N 23/57 348/E5.09 |
| 2015/0319378 A1* | 11/2015 | Hoelter | .................. | H04N 23/51 348/164 |
| 2015/0334316 A1* | 11/2015 | Wang | ..................... | H04N 23/56 348/143 |
| 2016/0065850 A1* | 3/2016 | Yu | ........................ | G02B 26/007 348/342 |
| 2018/0069995 A1* | 3/2018 | Lim | .................... | G02B 13/0055 |
| 2018/0356283 A1* | 12/2018 | Shikama | .................. | G03B 9/10 |
| 2020/0221037 A1 | 7/2020 | Lu et al. | | |

FOREIGN PATENT DOCUMENTS

| | | | |
|---|---|---|---|
| CN | 205782330 U | | 12/2016 |
| CN | 206386880 U | * | 8/2017 |
| CN | 206386880 U | | 8/2017 |
| CN | 107889318 A | | 4/2018 |
| CN | 208139196 U | | 11/2018 |
| WO | 2014121575 A1 | | 8/2014 |

OTHER PUBLICATIONS

Written Opinion in PCT/CN2018/121621 dated Sep. 18, 2019, 4 pages.
The Extended European Search Report in European Application No. 18944125.6 dated Sep. 15, 2021, 9 pages.
First Office Action in Chinese Application No. 201880100150.6 dated Jan. 20, 2022, 25 pages.

* cited by examiner

LIGHTING DEVICES FOR AUTOMATICALLY SWITCHING BETWEEN A VISIBLE LIGHT SOURCE AND AN INFRARED LIGHT SOURCE

CROSS-REFERENCE TO RELATED APPLICATIONS

This application is a continuation of International Patent Application No. PCT/CN2018/121621, filed on Dec. 17, 2018, the contents of each of which are hereby incorporated by reference.

TECHNICAL FIELD

The present disclosure generally relates to a lighting device, and more specifically relates to a lighting device for automatically switching between a visible light source and an infrared (IR) light source.

BACKGROUND

A lighting device, such as a strobe light is a device used to produce regular flashes of light which may supplement light for a camera. In a traffic monitoring system, the strobe light may be installed at a fork in a road, a school region and a residential area, etc., to work with a camera for capturing high quality images or high quality videos. The existing strobe light often emits white light as supplement light. Although the white light meets the demand for light supplement, it may also lead to a light pollution for drivers and nearby residents. Therefore, it is desirable to provide lighting devices for selectively supplementing light to reduce the light pollution.

SUMMARY

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

An aspect of the present disclosure introduces a lighting device for automatically switching between a visible light source and an infrared light source.

In some embodiments, the lighting device may include a light source, an infrared filter, and a driving module for driving the infrared filter.

In some embodiments, the infrared filter may include a plurality of blades, and the driving module drivers at least one blade of the plurality of blades for automatically switching between the visible light source and the infrared light source.

In some embodiments, the driving module may include a plurality of gears, each of the plurality of gears being mounted on each of the plurality of blades.

In some embodiments, the driving module may include a rotating ring and a plurality of driving arcs, each of the plurality of driving arcs connecting the rotating ring to each of the plurality of blades.

In some embodiments, the driving module may include a drive rod connecting to each of the plurality of blades.

In some embodiments, one of the plurality of blades may be a master blade and the lighting device further may include: a motor for providing power to the driving module, the motor including a limiting device for limiting a rotation angle of the plurality of blades; and a groove connecting the motor to the master blade so that the motor and the master blade rotate synchronously.

In some embodiments, the lighting device may further include an optocoupler baffle on the master blade for determining a state of the infrared filter.

In some embodiments, the lighting device may further include a lamp holder; a reflection cup; an isolator mounted on the lamp holder for isolating the light source to the lamp holder and the reflection cup; an optocoupler mounted below the master blade for determining a position of the optocoupler baffle; two first pressing plates for fixing the infrared filter; a first seal for sealing the motor; a first cover plate for covering the motor; a second seal for sealing the lamp holder; and a second cover plate for covering the lamp holder, the second cover plate including a second pressing plate and a glass cover of the lamp holder.

In some embodiments, the lighting device may further include a photosensor for detecting ambient light around the lighting device.

In some embodiments, the lighting device may further include at least one processor in communication with the photosensor and the driving module. And the at least one processor may be directed to: determine a light intensity of the ambient light that the photosensor detects; in response to a determination that the light intensity is greater than an intensity threshold, send a driving signal to the driving module for driving the infrared filter to a non-working state, wherein the lighting device emits visible light.

In some embodiments, the at least one processor may be further directed to: in response to a determination that the light intensity is less than the intensity threshold, send a driving signal to the driving module for driving the infrared filter to a working state, wherein the lighting device emits infrared light.

In some embodiments, the lighting device may further include a timing control module for controlling time sequences for turning on or turning off the infrared filter.

Another aspect of the present disclosure introduces an image capture system. The image capture system may include an image capture device; a lighting device configured to automatically switch between a visible light source and an infrared light source; at least one storage device including a set of instructions; at least one processor in communication with the at least one storage device, wherein when executing the set of instructions, the at least one processor is directed to cause the system to: obtain a first image under the visible light source that the lighting device emits, wherein the first image includes color information; obtain a second image under the infrared light source that the lighting device emits, wherein the second image includes luminance information; and generate an enhanced image based on the first image and the second image.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
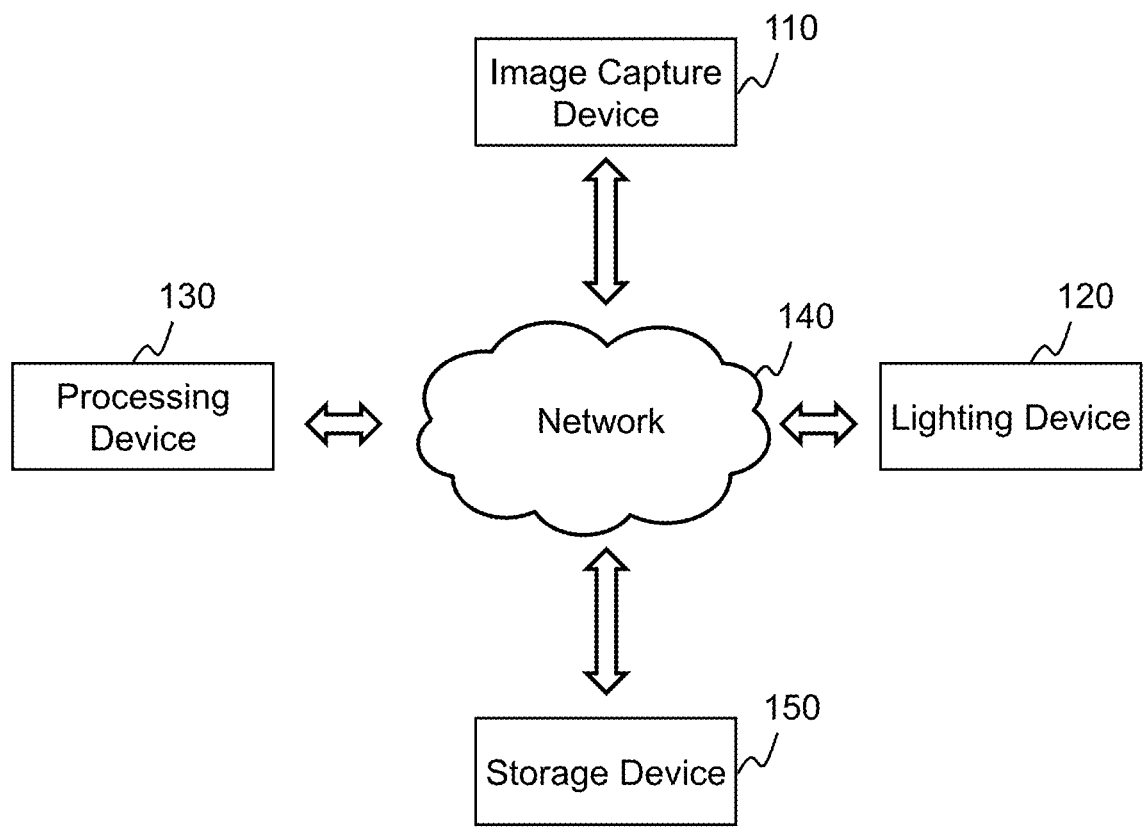
FIG. 1 is a schematic diagram illustrating an exemplary image capture system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, module, systems, devices, and/or drivers have been described at a relatively high-level, without detail, in order to avoid unnecessarily obscuring aspects of the present disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "module," and/or "unit" used herein are one method to distinguish different components, elements, parts, section or assembly of different level in ascending order. However, the terms may be displaced by other expressions if they may achieve the same purpose.

It will be understood that when a device, unit, or module is referred to as being "on," "connected to," or "coupled to" another device, unit, or module, it may be directly on, connected or coupled to, or communicate with the other device, unit, or module, or an intervening device, unit, or module may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

The disclosure is directed to systems and methods of a lighting device. The lighting device may automatically switch between a visible light source and an IR light source. In the present disclosure, the lighting device may include a switching device and one or more light sources. Specifically, in some embodiments, only one light source is used. The switching device may be controlled to be turned on or turned off, to achieve an aim of automatically switching between two kinds of lights. In some embodiments, the switching device may be an infrared filter, and the switching device maybe used to switch between the visible light source and the IR light according to actual conditions. The switch may be periodically turned on or off based on information detected according to the environment situation. For example, in a bright environment (e.g., at daytime), the light intensity may be large enough causing the switching device (e.g., the infrared filter) to be on an off-working state. With the switching device (e.g., the infrared filter) on the off-working state, the lighting device may emit visible light. Conversely, lighting device (e.g., the infrared filter) may emit IR light with the switching device on a working state to filter visible light in a dark environment (e.g., at night or in a condition of backlight) when the light intensity is weak. The switching device may be controlled by a logic related to environment sensor and/or image capture devices. For example, the switching device may be controlled directly or indirectly by an exposure-time controller which controls the exposure time of an image capture device to achieve better results of the image captured by the image capture device. The switching device may further control the light source(s) of the lighting device to emit different lights. The different lights emitted from the lighting device may provide supplementary light for a lens and/or sensor of the image capture device. For example, when the lighting device emits visible light for the image capture device, the image capture device may capture images with visible light. The captured images may include color information. When the lighting device emits IR light for the image capture device, the image capture device may capture images with IR light. The captured images may include luminance information. A processing device of an image capture system may process the images including color information and luminance information to generate an enhanced image to achieve better results of the image. The image capture system including the lighting device, the image capture device, and the processing device may capture images under different lights, and obtain a better image.

FIG. 1 is a schematic diagram illustrating an exemplary image capture system 100 according to some embodiments of the present disclosure. In some embodiments, the image capture system 100 may be used in an electronic device that needs to capture images or videos, for example, a digital camera, a video camera, a smartphone, a monitoring device, or the like. As illustrated in FIG. 1, the image capture system 100 may include an image capture device 110, a lighting device 120, a processing device 130, a network 140, and a storage device 150.

The image capture device 110 may be configured to capture images or videos. The images or videos may be two-dimensional (2D) or three-dimensional (3D). In some embodiments, the image capture device 110 may include a digital camera. The digital camera may include a 2D camera, a 3D camera, a panoramic camera, a virtual reality (VR) camera, a web camera, an instant picture camera, a video camera, a surveillance camera, or the like, or any combination thereof. In some embodiments, the image capture device 110 may include a stereo camera. The stereo camera may include a binocular vision device or a multi-camera. In some embodiments, the image capture device 110 may be added to or be part of a medical imaging equipment, a night-vision equipment, a radar equipment, a sonar equipment, an electronic eye, a camcorder, a thermal imaging equipment, a smartphone, a tablet PC, a laptop, a wearable equipment (e.g., 3D glasses), an eye of a robot, a vehicle traveling data recorder, an unmanned device (e.g., a unmanned aerial vehicle (UAV), a driverless car, etc.), a video gaming console, or the like, or any combination thereof.

In some embodiments, the image capture device 110 may include one or more lenses, a sensor, an exposure-time controller, an amplifier, and an analog to digital (A/D) converter.

The lens may be an optical or digital device that focuses light (e.g., visible light and/or IR light) by means of refraction to form an image. The lens may be configured to intake scenes it is facing at. It may include aperture mechanisms to adjust the aperture of the lens. An aperture of the lens may refer to the size of the hole through which light passes to reach the sensor. The larger the aperture is, the more light the lens takes in, and thereby the brighter the image captured by the image capture device 110 is. The aperture may be adjustable to adjust the amount of light that passes through the lens. The focal lengths of the one or more lenses may be fixed or may be adjustable to adjust the coverage of the image capture device 110. The lens may be controlled by a controller. For example, in some embodiments, different lens or the structure of the lens may be controlled by a controller according to the switching condition of the light source. In some embodiments, with the switching device (e.g., the infrared filter) on the off-working state, the lighting device may emit visible light, accordingly, specific set of lens or lens structure may be used to capture visible light in a more suitable condition. Conversely, lighting device (e.g., the infrared filter) may emit IR light with the switching device on a working state to filter visible light in a dark environment (e.g., at night or in a condition of backlight) when the light intensity is weak, accordingly, another set of lens or lens structure may be used to capture IR light in a more suitable condition.

The sensor may detect and convey the light (e.g., visible light and/or IR light) taken by the lens into electronic signals. The sensor may include charge coupled device (CCD) and complementary metal-oxide semiconductor (CMOS). In some embodiments, different kinds of sensors may be selected according to different switching condition of the light source. The sensor may be controlled by a logical related to the switching device. For example, the sensor may be controlled directly or indirectly by a controller connected to the switching device. In some embodiments, with the switching device (e.g., the infrared filter) on the off-working state, the lighting device may emit visible light, accordingly, specific set of sensor or sensor structure may be used to detect and convey the light taken by the lens into electronic signals in a more suitable condition. Conversely, lighting device (e.g., the infrared filter) may emit IR light with the switching device on a working state to filter visible light in a dark environment (e.g., at night or in a condition of backlight) when the light intensity is weak, accordingly, another set of sensor or sensor structure may be used to detect and convey the light taken by the lens into electronic signals in a more suitable condition.

The exposure-time controller may be configured to control an exposure time of the image capture device 110. The exposure time may refer to the length of time when the sensor inside the image capture device 110 generates the electrical signals. In some embodiments, the exposure-time controller may be a shutter device (e.g., a mechanical shutter) configured to open to allow light to reach the sensor through the one or more lenses to make the sensor generate the electrical signals when an image is captured. The shutter device may be controlled manually or automatically. An interval from open to closed of the shutter device to take pictures of the scenes may be the exposure time (also referred to as a shutter speed). In some embodiments, the sensor does not generate electrical signals without electricity even though light reaches the sensor. The exposure-time controller may be an electronic shutter to control the length of time when the sensor is charged with electricity (also referred to as the exposure time or the shutter speed). The longer the exposure time is, the more electrical signals the sensor generates, and thereby the brighter the image captured by the image capture device 110 is. The exposure-time controller may be configured to connect with the light source. For example, the exposure-time controller may directly or indirectly control the switching device, and the switching device may further switch on-working or off-working state to control the light source to emit different light. The on-working or off-working state of the switching device may be controlled according to an exposure-time controlled by the exposure-time controller.

The amplifier may be configured to amplify the electrical signals generated by the sensor. The magnification of the electrical signals generated by the sensor may be referred to as a gain level. The higher the gain level takes, the brighter the image captured by the image capture device 110 is (a side effect of a higher gain level is that the noise is higher as well). In some embodiments, different kinds of amplifiers may be selected according to different switching condition of the light source. The amplifier may be controlled by the logical related to the switching device. For example, the amplifier may be controlled directly or indirectly by a controller connected to the switching device. In some embodiments, with the switching device (e.g., the infrared filter) on the off-working state, the lighting device may emit visible light, accordingly, specific set of amplifier or amplifier structure may be used to amplify the electrical signals generated by the sensor in a more suitable condition. Conversely, lighting device (e.g., the infrared filter) may emit IR light with the switching device on a working state to filter visible light in a dark environment (e.g., at night or in a condition of backlight) when the light intensity is weak, accordingly, another set of amplifier or amplifier structure may be used to amplify the electrical signals generated by the sensor in a more suitable condition.

The A/D converter may be configured to transform the amplified electrical signals from the amplifier into digital signals. The digital signals may be transformed to an image processor (e.g., the processing device 130 or a processor in the image capture device 110) to generate an image.

In some embodiments, one or more components (e.g., the image capture device 110, the lighting device 120, the processing device 130, or the storage device 150) of the image capture device 110 may communicate with each other via the network 140. For example, the lighting device 120 may send a switching signal to the processing device 130 via the network 140. The switching signal may indicate what kind of light (e.g., the visible light, the IR light) that the lighting device 120 emits. The image capture device 110 may send captured images to the processing device 130 via the network 140. The processing device 130 may receive the switching signal and process the captured images captured based on the switching signal, and send the processed result (e.g., an enhanced image) to the storage device 150 via the network 140.

In some embodiments, when the image capture device 110 is in a bright environment, a filter configured to prevent IR light (e.g., IR light from objects surrounding the image capture device 110) from being received by the sensor may be added to the image capture device 110, which ensures the color of images captured in the bright environment. The filter may be removed when the image capture device 110 works in the dark environment, which makes the IR light from the lighting device 120 be received by the sensor to increase luminance of images captured in the dark environment.

In some embodiments, the image capture device 110 may include a double pass filter that allows IR light with specific wavelengths (e.g., 840-860 nm) and visible light to pass through. When the image capture device 110 is in the bright environment, the influence of IR light on the color of images captured in the bright environment may be decreased because the IR light with specific wavelengths, instead of all IR light (e.g., IR light with wavelengths of 700 nm-1 mm), is allowed to be received by the sensor. The luminance of images captured in the dark environment may be increased based on the IR light with specific wavelengths. Compared to switching the filter between the dark environment and the bright environment, using the double pass filter in the image capture device 110 may avoid time consumption caused by switching the filter.

The lighting device 120 may emit light (e.g., flash) to supplement light for the image capture device 110. For example, in a bright environment (e.g., at daytime), the lighting device 120 may emit visible light. In a dark environment (e.g., at night or in a condition of backlight), the lighting device 120 may emit IR light. In some embodiments, the lighting device 120 may communicate with one or more components (e.g., the image capture device 110, the processing device 130, or the storage device 150) of the image capture system 100 via the network 140. In some embodiments, the lighting device 120 may be directly connected to the one or more components (e.g., the image capture device 110, the processing device 130, or the storage device 150) of the image capture system 100. In some embodiments, the lighting device 120 may be part of the image capture system 100. In some embodiments, the lighting device 120 may be an external device that communicates or does not communicate with the image capture system 100. In some embodiments, the lighting device 120 may integrate with the image capture device 110 as a signal device. In some embodiments, the lighting device 120 may be controlled by one or more components (e.g., the exposure-time controller of the image capture device 110, the processing device 130) of the image capture system 100. For example, the exposure-time controller of the image capture device 110 may send an exposure-time control signal to a switching device (e.g., a IR filter) of the lighting device 120. The exposure-time control signal may control the time of on-working or off-working state of the switching device.

The processing device 130 may process information and/or data to perform one or more functions described in the present disclosure. For example, the processing device 130 may generate an enhanced image based on color image data and luminance image data.

In some embodiments, the processing device 130 may be a single server or a server group. The server group may be centralized, or distributed (e.g., the processing device 130 may be a distributed system). In some embodiments, the processing device 130 may be local or remote. For example, the processing device 130 may access/transmit information and/or data in/to the image capture device 110, the lighting device 120, or the storage device 150 via the network 140. As another example, the processing device 130 may be directly connected to the image capture device 110, the lighting device 120, or the storage device 150 to access/transmit information and/or data. In some embodiments, the processing device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 130 may be implemented on a computing device 200 having one or more components illustrated in FIG. 2 in the present disclosure.

In some embodiments, the processing device 130 may be implemented on a mobile device, a tablet computer, a laptop computer, a built-in device in a motor vehicle, or the like, or any combination thereof. In some embodiments, the mobile device may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, a RiftCon™, a Fragments™, a Gear VR™, etc. In some embodiments, the built-in device in the motor vehicle may include an onboard computer, an onboard television, a traveling data recorder, etc. In some embodiments, the processing device 130 may be implemented on a mobile device 300 having one or more components illustrated in FIG. 3 in the present disclosure.

In some embodiments, the processing device 130 may include one or more processing engines (e.g., single-core processing engine(s) or multi-core processor(s)). Merely by way of example, the processing device 130 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof. In some embodiments, the processing device 130 may be part of the image capture system 100.

The network 140 may be configured to facilitate communications among the components (e.g., the image capture device 110, the lighting device 120, the processing device 130, and the storage device 150) of the image capture system 100. For example, the network 140 may transmit digital signals from the image capture device 110 to the processing device 130. As another example, the network 140 may transmit images generated by the image capture device 110 to the storage device 150.

In some embodiments, the network 140 may include a wired network, a wireless network, or any connection capable of transmitting and receiving data. In some embodiments, the wired network may include a connection using a metal cable, an optical cable, a hybrid cable, or the like, or any combination thereof. In some embodiments, the wireless network may include a near field communication (NFC), a body area network (BAN), a personal area network (PAN, e.g., a Bluetooth, a Z-Wave, a Zigbee, a wireless USB), a near-me area network (NAN), a local wireless network, a backbone, a metropolitan area network (MAN), a wide area network (WAN), an internet area network (IAN, or cloud), or the like, or any combination thereof.

The storage device 150 may be configured to store data and/or instructions. In some embodiments, the storage device 150 may store data obtained from the processing device 130 and/or the image capture device 110. For example, the storage device 150 may store images generated by the processing device 130 and/or the image capture device 110. In some embodiments, the storage device 150 may store data and/or instructions that the processing device 130 may execute or use to perform exemplary methods described in the present disclosure. For example, the storage device 150 may store instructions that the processing device 130 may execute to generate an enhanced image based on color image data and luminance image data. In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 140 to communicate with one or more components in the image capture system 100 (e.g., the image capture device 110, the lighting device 120, and the processing device 130). One or more components in the image capture system 100 may access the data or instructions stored in the storage device 150 via the network 140. In some embodiments, the storage device 150 may be directly connected to or communicate with one or more components in the image capture system 100 (e.g., the image capture device 110, the lighting device 120, and the processing device 130). In some embodiments, the storage device 150 may be part of the image capture device 110, the lighting device 120, and/or the processing device 130.

In some embodiments, two or more components of the image capture system 100 may be integrated in one device. For example, the image capture device 110, the processing device 130, and the storage device 150 may be integrated in one device (e.g., a camera, a smartphone, a laptop, a workstation, a server, etc.). In some embodiments, one or more components of the image capture system 100 may be located remote from other components. For example, the image capture device 110 may be installed at a location away from the processing device 130, which may be implemented in a single device with the storage device 150.

It should be noted that the component of the image capture system 100 illustrated in FIG. 1 may be implemented via various ways. For example, the components may be implemented through hardware, software, or a combination thereof. Herein, the hardware may be implemented by a dedicated logic; the software may be stored in the storage, the system may be executed by proper instructions, for example, by a microprocessor or a dedicated design hardware. Those skilled in the art can understand that, the methods and systems described in this disclosure may be implemented by the executable instructions of a computer and/or by control code in the processor, for example, the code supplied in a carrier medium such as a disk, a CD, a DVD-ROM, in a programmable storage such as a read-only memory, or in a data carrier such as optical signal carrier or electric signal carrier. The systems and the methods in the present application may be implemented by a hardware circuit in a programmable hardware device in a ultra large scale integrated circuit, a gate array chip, a semiconductor such as a transistor, a field programmable gate array, a programmable logic device, a software performed by various processors, or a combination thereof (e.g., firmware).

Figure 2:
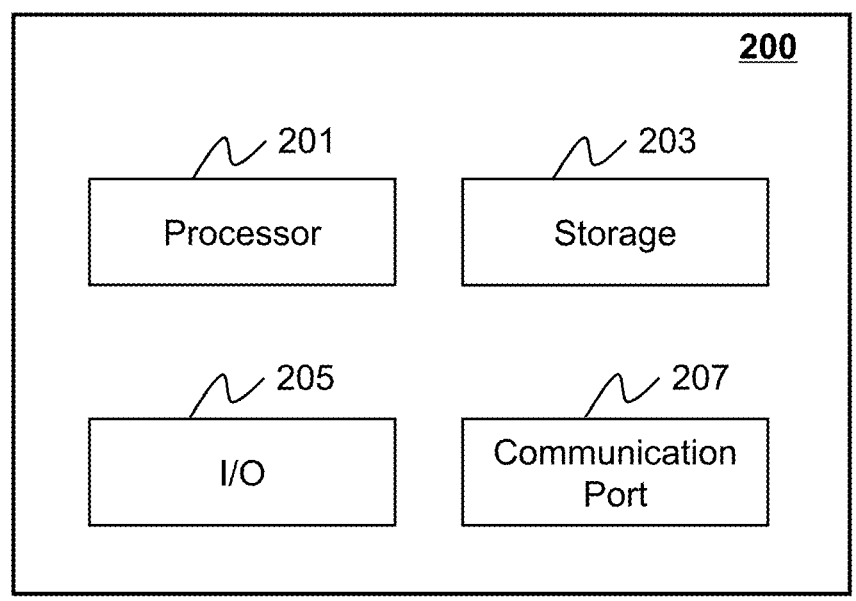
FIG. 2 is a schematic diagram illustrating exemplary hardware and software components of a computing device according to some embodiments of the present disclosure.

FIG. 2 is a schematic diagram illustrating exemplary hardware and/or software components of a computing device on which the image capture device 110, the lighting device 120, or the processing device 130 may be implemented according to some embodiments of the present disclosure. As illustrated in FIG. 2, the computing device 200 may include a processor 201, a storage 203, an input/output (I/O) 205, and a communication port 207.

The processor 201 may execute computer instructions (program code) and perform functions of the processing device in accordance with techniques described herein. The computer instructions may include routines, programs, objects, components, signals, data structures, procedures, modules, and functions, which perform particular functions described herein. For example, the processing device 130 may be implemented on the computing device 200 and the processor 201 may generate control signals for the lighting device 120 to switch between the visible light source and the IR light source. In some embodiments, the processor 201 may include a microcontroller, a microprocessor, a reduced instruction preset computer (RISC), an application specific integrated circuits (ASICs), an application-specific instruction-preset processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration purposes, only one processor is described in the computing device 200. However, it should be note that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., a first processor executes step A and a second processor executes step B, or the first and second processors jointly execute steps A and B).

The storage 203 may store data/information obtained from any other component of the computing device 200 (e.g., the processor 201). In some embodiments, the storage 203 may include a mass storage device, a removable storage device, a volatile read-and-write memory, a read-only memory (ROM), or the like, or any combination thereof. For example, the mass storage device may include a magnetic disk, an optical disk, a solid-state drive, etc. The removable storage device may include a flash drive, a floppy disk, an optical disk, a memory card, a zip disk, a magnetic tape, etc. The volatile read-and-write memory may include a random-access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 203 may store one or more programs and/or instructions to perform exemplary methods described in the present disclosure. For example, the storage 203 may store a program for switching the lighting device 120 between the visible light source and the IR light source based on light intensity of the environments. As another example, the storage 203 may store images captured by the image capture device 110.

The I/O 205 may input or output signals, data, or information. In some embodiments, the I/O 205 may enable a user interaction with the processing device. For example, a captured image may be displayed through the I/O 205. In some embodiments, the I/O 205 may include an input device and an output device. Exemplary input devices may include a keyboard, a mouse, a touch screen, a microphone, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 207 may be connected to a network to facilitate data communications. The communication port 207 may establish connections between the computing device 200 (e.g., the capture device 100) and an external device (e.g., a smart phone). The connection may be a wired connection, a wireless connection, or combination of both that enables data transmission and reception. The wired connection may include an electrical cable, an optical cable, a telephone wire, or the like, or any combination thereof. The wireless connection may include Bluetooth, Wi-Fi, WiMax, WLAN, ZigBee, mobile network (e.g., 3G, 4G, 5G, etc.), or the like, or a combination thereof. In some embodiments, the communication port 207 may be a standardized communication port, such as RS232, RS485, etc.

Figure 3:
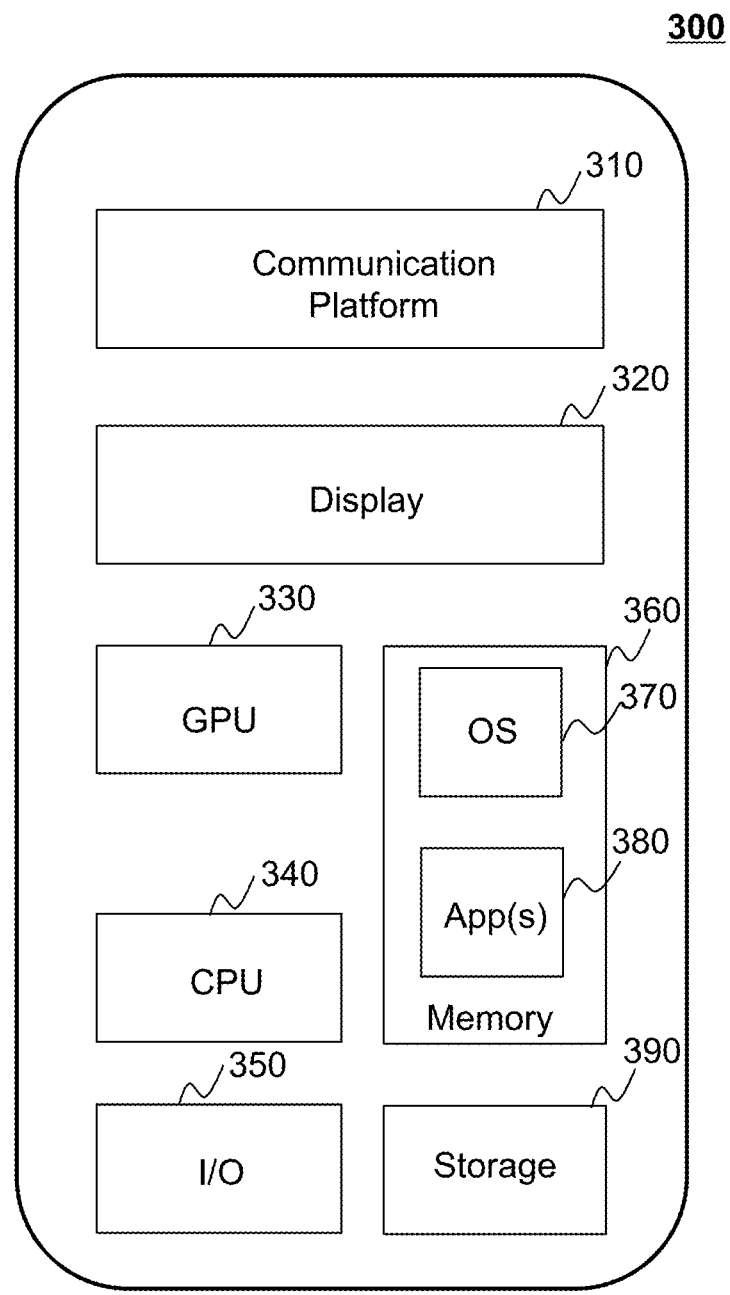
FIG. 3 is a schematic diagram illustrating exemplary hardware and software components of a mobile device according to some embodiments of the present disclosure.

FIG. 3 is a schematic diagram illustrating exemplary hardware and/or software components of a mobile device on which the image capture device 110, the lighting device 120, or the processing device 130 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™ Android™, Windows Phone™, etc.) and one or more applications 380 may be loaded into the memory 360 from the storage 390 in order to be executed by the CPU 340. The applications 380 (e.g., a taxi-hailing application) may include a browser or any other suitable mobile apps for receiving and rendering information relating to transportation services or other information from the processing device 130. User interactions with the information stream may be achieved via the I/O 350 and provided to the processing device 130 and/or other components of the speed prediction system 100 via the network 140. Merely by way of example, a road feature transmit to a service requester may be displayed in the user terminal 140 through the display 320. As another example, a service provider may input an image related to a road segment through the I/O 350.

Hence, aspects of the methods of the image processing and/or other processes, as described herein, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors, or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a scheduling system into the hardware platform(s) of a computing environment or other system implementing a computing environment or similar functionalities in connection with image processing. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

A machine-readable medium may take many forms, including but not limited to, a tangible storage medium, a carrier wave medium or physical transmission medium. Non-volatile storage media include, for example, optical or magnetic disks, such as any of the storage devices in any computer(s), or the like, which may be used to implement the system or any of its components shown in the drawings. Volatile storage media may include dynamic memory, such as main memory of such a computer platform. Tangible transmission media may include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media may include, for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described herein may be embodied in a hardware device, it may also be implemented as a software only solution (e.g., an installation on an existing server). In addition, image processing as disclosed herein may be implemented as firmware, a firmware/software combination, a firmware/hardware combination, or a hardware/firmware/software combination.

Figure 4:
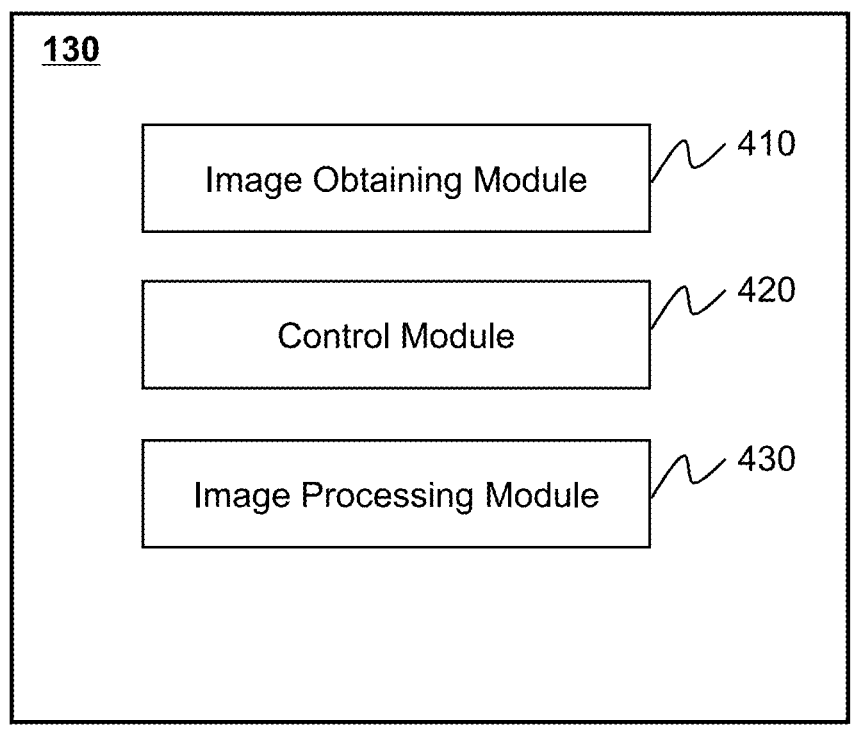
FIG. 4 is a schematic diagram illustrating an exemplary processing device according to some embodiments of the present disclosure.

FIG. 4 is a schematic diagram illustrating an exemplary processing device according to some embodiments of the present disclosure. The processing device 130 may include an image obtaining module 410, a control module 420, and an image processing module 430.

The image obtaining module 410 may be configured to obtain an image from the image capture device 110. For example, the image obtaining module 410 may obtain a first image under the visible light source that the lighting device emits. The first image may include color information. As another example, the image obtaining module 410 may obtain a second image under the infrared light source that the lighting device emits. The second image may include luminance information. In some embodiments, the image obtaining module 410 may obtain an image from the storage device 150 (or any other storage of the image capture system 100).

The control module 420 may be configured to control one or more components (e.g., the image capture device 110, the lighting device 120, etc.) of the image capture system 100. For example, the control module 420 may control the image capture device 110 to capture images. As another example, the control module 420 may control the lighting device 120 for automatically switching between a visible light source and an infrared light source. For example, the control module 420 may be a timing control module controlling time sequences for turning on or turning off the infrared filter of the lighting device 120. As another example, the control module 420 may communicate with a photosensor. In response to a weak light intensity of an ambient light around the lighting device 120 that the photosensor detects, the control module 420 may send a driving signal for driving the infrared filter to a non-working state. The lighting device may emit visible light. In response to a strong light intensity of an ambient light around the lighting device 120 that the photosensor detects, the control module 420 may send a driving signal for driving the infrared filter to a non-working state. The lighting device may emit visible light. In response to a weak light intensity of an ambient light around the lighting device 120 that the photosensor detects, the control module 420 may send a driving signal for driving the infrared filter to a working state. The lighting device may emit infrared light.

The image processing module 430 may be configured to process the image obtained by the image obtaining module 410. For example, the image processing module 430 may fuse the first image including color information and the second image including luminance information to generate an enhanced image.

The modules in the processing device 130 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the image obtaining module 410 and the image processing module 430 may be combined into a single module which may both obtain and process image data. As another example, the control module 420 may be integrated into the lighting device 120 instead of the processing device 130.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing device 130 may further include a storage module (not shown in FIG. 4). The storage module may be configured to store data generated during any process performed by any component of in the processing device 130. As another example, each of components of the processing device 130 may correspond to a storage module, respectively. Additionally or alternatively, the components of the processing device 130 may share a common storage module.

Figure 5:
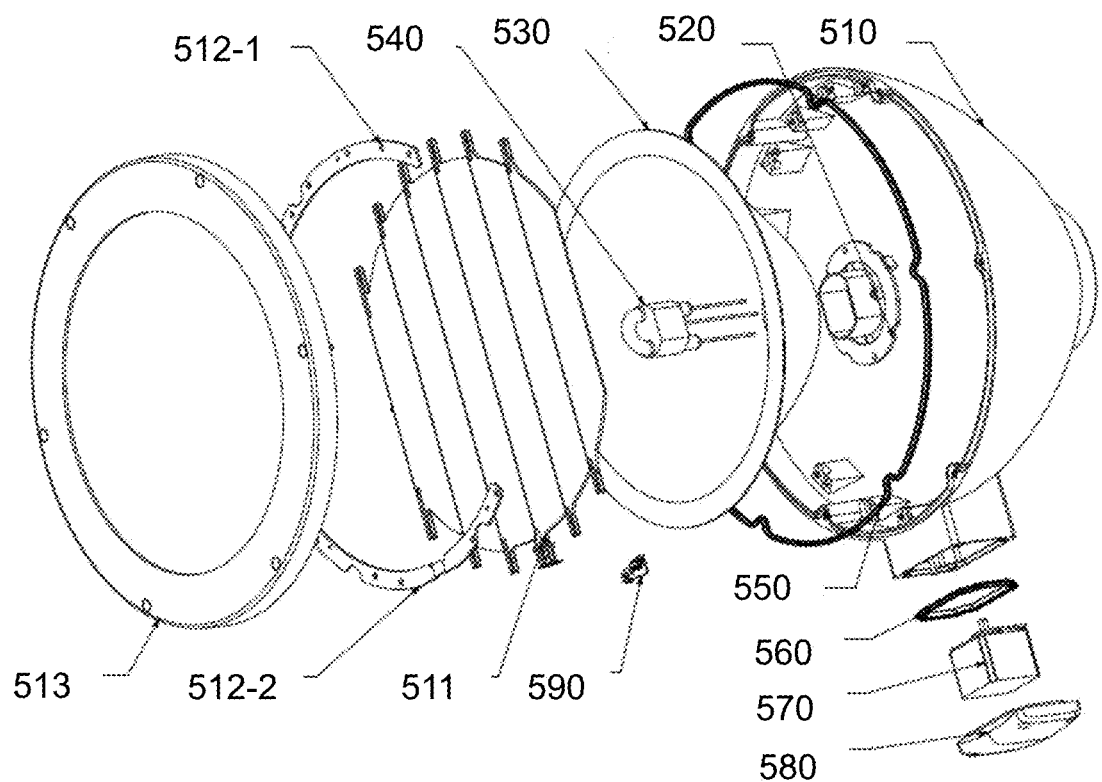
FIG. 5 is an exemplary exploded view of a lighting device according to some embodiments of the present disclosure.

FIG. 5 illustrate an exemplary exploded view of a lighting device according to some embodiments of the present disclosure. The lighting device 120 may include basic components, driving components (also refers to a driving module) and filtering components (also refers to an infrared filter). The driving components may include a motor seal ring (also refers to a first seal) 560, a motor part (also refers to a motor) 570, a motor cover plate (also refers to a first cover plate) 580, and an optocoupler 590. The basic components may include a lamp holder 510, an isolation part (also refers to an isolator) 520, a reflective part (also refers to a reflection cup) 530, a lamp bead (also refers to a light source) 540, a cover seal ring (also refers to a second seal) 550, and a cover part (also refers to a second cover plate) 513. The filtering components may include an infrared filter part (also refers to a filter) 511, and two pressing plates (also refers to first pressing plates) 512-1 and 512-2. The driving components and/or the filtering components may be in detachable connection with the basic components. The driving components may be controlled to determine a state (e.g. a working state or an off-working state) of the filtering components. When the filtering components are on the working state, the lighting device 120 may emit IR light. When the filtering components are on the off-working state, the lighting device 120 may emit visible light.

In some embodiments, the lamp holder 510 may be configured to provide a support for the light device 120. Other components (e.g. the reflective part (also refers to the reflection cup) 530, the lamp bead (also refers to the light source) 540, the cover part (also refers to the second cover plate) 513, etc.) of the light device 120 may be detachably/ non-detachably connect with the lamp holder 510. The isolation part (also refers to the isolator) 520 may be mounted on the lamp holder 510, and may be configured to isolate the lamp bead (also refers to the light source) 540 to the lamp holder 510 and the reflection part (also refers to the reflection cup) 530. Also isolation part (also refers to the isolator) 520 may function as a buffer when the light device 120 is subjected to a vibration. In some embodiments, the isolation part (also refers to the isolator) 520 may be manufactured by plastic materials, such as Teflon, polyvinyl chloride, polyamides, etc. The reflective part (also refers to the reflection cup) 530 may be configured to set in inner space of the lamp holder 510 to converge the light emitted by the lamp bead (also refers to the light source) 540. For example, the reflective part (also refers to the reflection cup) 530 may has a cup-shaped structure with an inner surface coated with reflective materials. The bottom of the reflective part (also refers to the reflection cup) 530 may closely cling to the isolation part (also refers to the isolator) 520, and may include a hole to contain the lamp bead (also refers to the light source) 540. The lamp bead (also refers to the light source) 540 may be set at the bottom of the reflective part (also refers to the reflection cup) 530 and be configured to emit light. The light emitted by the lamp bead (also refers to the light source) 540 may include different wavelength ranges of light, such as infrared light corresponding to a wavelength range larger than 800 nanometers, visible light corresponding to a wavelength range from 400 nanometers to 800 nanometers, or the like, or any combination thereof. The cover seal ring (also refers to the second seal) 550 may be set between the cover part (also refers to the second cover plate) 513 and the lamp holder 510, which is manufactured by waterproof and high temperature resistant materials, such as silicone. The cover seal ring (also refers to the second seal) 550 may be configured to seal the lamp holder. The cover part (also refers to the second cover plate) 513 may be in detachable connection with the lamp holder 510. The cover part (also refers to the second cover plate) 513 may be configured to cover the lamp holder 510. The cover seal ring (also refers to the second seal) 550 may cooperate with the cover part (also refers to the second cover plate) 513 to prevent water (e.g. rainwater) from entering into interior of the light device 120.

The driving components may have a square housing which is integrally connected on the outside of the lamp holder 510. The inner space of the square housing may be configured to mount the motor part (also refers to the motor) 570. The motor part (also refers to the motor) 570 may be configured to provide power to the driving components. For example, the motor part (also refers to the motor) 570 may be controlled to rotate in different directions (e.g. clockwise direction or counterclockwise direction), which may determine the state (e.g. the working state or the off-working state) of infrared filter part (also refers to the filter) 511. The motor seal ring (also refers to the first seal) 560 may be set between the motor part (also refers to the motor) 570 and the motor cover plate (also refers to the first cover plate) 580 to seal the motor. For example, the motor seal ring (also refers to the first seal) 560 may be configured to damp the vibration generated by the operation of the motor part (also refers to the motor) 570. In some embodiments, the motor seal ring (also refers to the first seal) 560 may be made of a waterproof material, and may cooperate with the motor cover plate (also refers to the first cover plate) 580 to prevent water from entering into the motor part (also refers to the motor) 570. The motor cover plate (also refers to the first cover plate) 580 may be configured to cover the motor part (also refers to the motor) 570. The optocoupler 590 may be configured to determine the state of the infrared filter part (also refers to the filter) 511. The optocoupler 590 may be mounted in the motor part (also refers to the motor) 570.

The infrared filter part (also refers to the filter) 511 may be configured to filter the visible light from the light emitted by the lamp bead (also refers to the light source) 540 and let the IR light pass through when it is on the working state. When the infrared filter part (also refers to the filter) 511 is on the off-working state, the light emitted by the lamp bead (also refers to the light source) 540 may pass through unhindered. The two pressing plates (also refers to the first pressing plates) 512-1 and 512-2 may be set between the infrared filter part (also refers to the filter) 511 and the cover part (also refers to the second cover plate) 513 to fix the infrared filter part (also refers to the filter) 511 on the lamp holder 510.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the driving components may be set on the bottom of the lamp holder 510. As another example, the driving components may be directly set inside the lamp holder 510.

Figure 6:
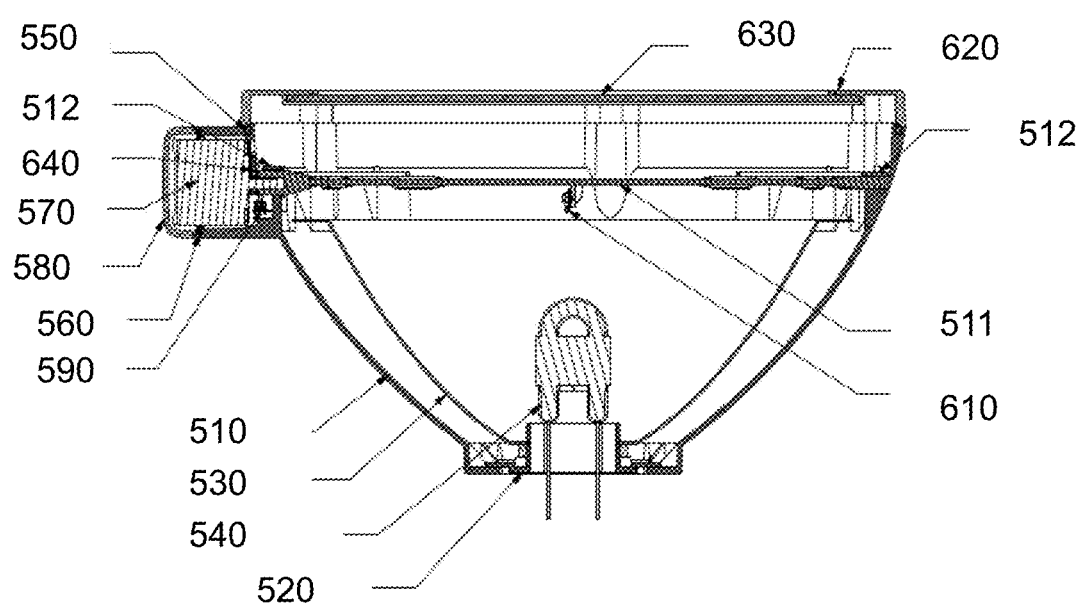
FIG. 6 is an exemplary side section view of the lighting device according to some embodiments of the present disclosure.

FIG. 6 illustrate an exemplary side section view of a lighting device according to some embodiments of the present disclosure. As shown in FIG. 6, the driving components (also refers to the driving module) may further include a drive rod 610 and a limiting device 640. The cover part (also refers to the second cover plate) 513 may further include a pressing plate (also refers to a second pressing plate) 620 and a glass cover 630. The drive rod 610 may be connected to the motor part (also refers to the motor) 570 and rotate synchronously with the motor part (also refers to the motor) 570. The limiting device 640 may be configured to limit the rotate angle of the motor part (also refers to the motor) 570. For example, the rotate angle of the motor part (also refers to the motor) 570 may be limited in an angle range of 0 to 95 degrees. The glass cover 630 may be configured to protect the lighting device 120. For example, the glass cover 630 may prevent the water and dust from entering the lighting device 120 and let the light emitted by the lamp bead (also refers to the light source) 540 come out to illuminate the object. The pressing plate (also refers to a second pressing plate) 620 may be set outside the glass cover 630 to fix the glass cover 630 on the lamp holder 510.

In some embodiments, the lamp holder 510 may have an approximately cup-shaped structure. The isolation (also refers to the isolator) 520 and lamp bead (also refers to a light source) 540 may be set in turn at the bottom of the cup-shaped lamp holder 510. The reflective part (also refers to the reflection cup) 530 may nested in the lamp holder 510, with a similar approximately cup-shaped structure but a smaller size. At the bottom of the reflective part (also refers to the reflection cup) 530, a hole may be designed for the lamp bead (also refers to the light source) 540 entering the interior of the reflective part (also refers to the reflection cup) 530, so that the reflective part (also refers to the reflection cup) 530 may concentrate the light emitted by the lamp bead (also refers to the light source).

As shown in FIG. 6, the driving components may be set at the outer side closing to the top of the lamp holder 510. The square housing of the driving components may provide inner space for the motor part (also refers to the motor) 570, which is connected with the infrared filter part (also refers to the filter) 511. The motor seal ring (also refers to the first seal) 560 and the motor cover plate (also refers to the first cover plate) 580 may be set in turn outer side the motor part (also refers to the motor) 570 to seal the motor part, such as preventing it from rain, dew, dust, fog, or the like, or any combination thereof. The limiting device 640 may be connect with the motor part (also refers to the motor) 570 to limit the rotate angle of the motor part (also refers to the motor) 570.

In FIG. 6, the infrared filter part (also refers to the filter) 511 may be placed inside the lamp holder 510 closing to the top and above the lamp bead (also refers to the light source) 540 to filter the light emitted by the lamp bead (also refers to the light source) 540. The infrared filter part (also refers to the filter) 511 may be connect with the motor part (also refers to the motor) 570 and switching its working state according to the rotate angle of the motor part (also refers to the motor) 570. In some embodiments, the infrared filter part may include a plurality of blades. The drive rod 610 may be connect with the infrared filter part (also refers to the filter) 511 and be used to keep blades of the infrared filter part (also refers to the filter) 511 in a same rotate angle. At the top of the lamp holder 510, the cover part (also refers to the second cover plate) 513, including the pressing plate (also refers to a second pressing plate) 620 and the glass cover 630, may be detachably connected with the lamp holder 510. The detachable connection may include a snap connection, a screw connection, a hinge connection, or the like, or any combination thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the limiting device 640 may not be connected with the motor part (also refers to the motor) 570, but be integrally or detachably connected with the infrared filter part (also refers to the filter) 511. In this situation, when the infrared filter part (also refers to the filter) 511 is driven to rotate by the motor part (also refers to the motor) 570, the limiting device 640 may rotate synchronously.

Figure 7A:
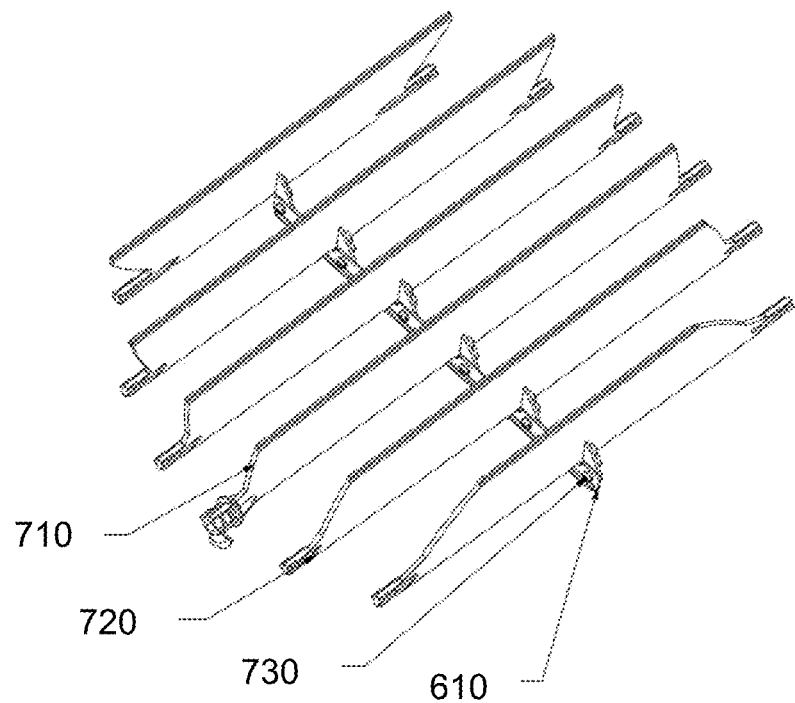
FIG. 7A is a side view of an exemplary infrared filter according to some embodiments of the present disclosure.
Figure 7B:
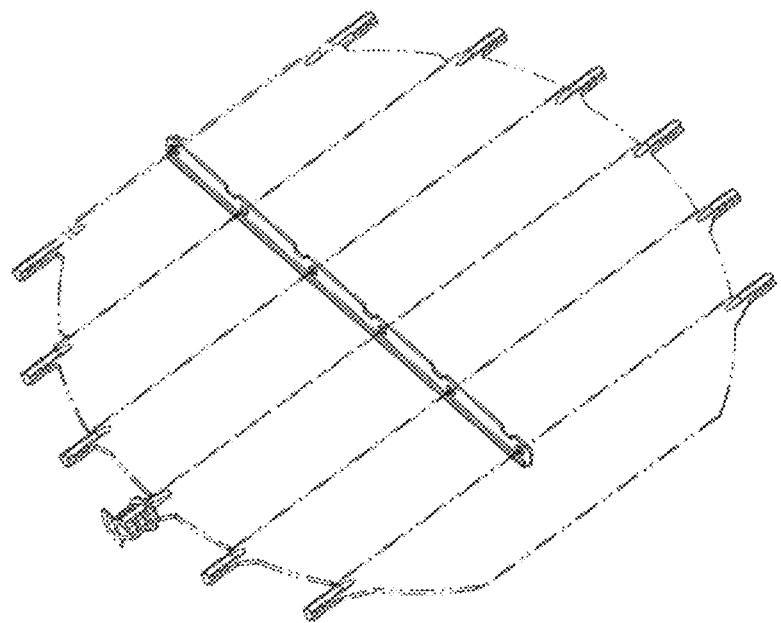
FIG. 7B is a side view of an exemplary infrared filter according to some embodiments of the present disclosure.

FIG. 7A and FIG. 7B are side views of an exemplary infrared filter according to some embodiments of the present disclosure, respectively.

As shown in FIG. 7A and FIG. 7B, the infrared filter may include a plurality of blades (a master blade 710, one or more slave blades 720), a plurality of connection shafts 730 and the drive rod 610. Each of the plurality of blades may be an infrared filter which may absorb visible light but allow infrared light to pass through. Each of the plurality of blades may correspond one rotating shaft of the plurality of connection shafts 730 and a connection part, through which the blade may be connected with the drive rod 610. In some embodiments, the master blade 710 may be detachably connected with the motor part (also refers to the motor) 570. When the motor rotates at an angle, the master blade 710 may be driven by the motor to rotate at a same angle. The rotation of the master blade 710 may drive the drive rod 610 to move through the connection part. The movement of the drive rod 610 may further drive the one or more slave blades 720 to synchronously rotate at the same corresponding angles through the corresponding connection parts and the connection shafts 730 of the one or more slave blades 720.

In FIG. 7A and FIG. 7B, two different working states of the infrared filter part (also refers to the filter) 511 may be shown. The infrared filter part (also refers to the filter) 511 may be on off-working state as shown in FIG. 7A and on working state as shown in FIG. 7B. When the infrared filter part (also refers to the filter) 511 is on off-working state, the plurality of blades may stand up. The light emitted by the lamp bead (also refers to the light source) 540, including visible light and infrared light, may directly irradiate on the object (e.g. a license plate, a driver's face, etc.). When the infrared filter part (also refers to the filter) 511 is on working state, the plurality of blades may lie down. The visible light included in the light emitted by the lamp bead (also refers to the light source) 540 may be absorbed. While, the infrared light may be allowed to pass through and irradiate on the object (e.g. the license plate, the driver's face, etc.).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the motor part (also refers to the motor) 570 may be connected with the drive rod 610. Thus, the rotation of the motor may directly drive the drive rod 610 to move further causing the rotations of the plurality of blades. As another example, for each of the plurality of blades, a motor may be arranged to control its rotation.

Figure 8:
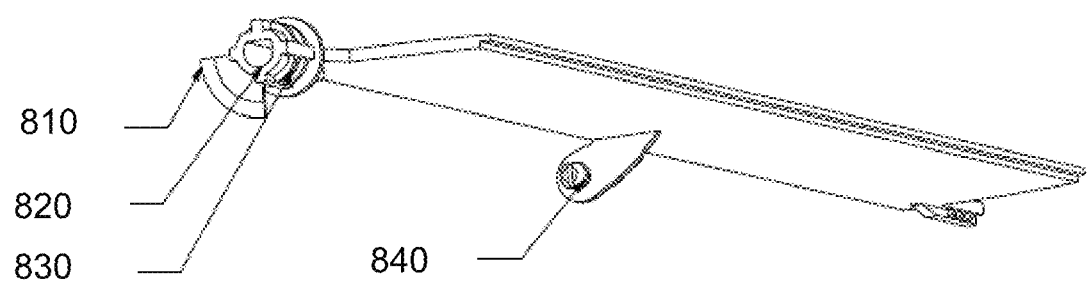
FIG. 8 is an exemplary view of a master blade according to some embodiments of the present disclosure.

FIG. 8 illustrate an exemplary master blade according to some embodiments of the present disclosure.

As shown in FIG. 8, the master blade 710 may include an optocoupler baffle 810, a groove 820, a baffle shaft 830, and a connection shaft 840. The optocoupler baffle 810 may be detachably connect to one end the baffle shaft 830 and may rotate synchronously following the master blade 710. The optocoupler baffle 810 may be used to determine the rotate angle of the master blade 710 based on a determination of whether optocoupler signals are blocked by the optocoupler baffle 810. More description of optocoupler baffle 810 may be found elsewhere in the present disclosure (e.g., FIGS. 11B and 12B and the descriptions thereof).

The groove 820 may be configured to connect the motor part (also refers to the motor) 570 to the master blade 710 so that the motor and the master blade rotate synchronously. A sectional view of the groove 820 may be a letter (such as, "D", "T", "C", etc.), a character (such as, "–", "+", "=" "θ", "Φ", etc.), a polygon (such as triangle, square, rectangle, diamond, hexagon, etc.), or the like, or any combination thereof. In some embodiments, the groove 820 may have a plurality of sectional views corresponding to different depth. For example, the groove 820 may have two different sectional views, for example, a "x" and a "□". The depth range of the groove 820 may be from 0 to 5 millimeters. The "x" type sectional view of the groove 820 may correspond to a depth range of 3-5 millimeters. The "□" type sectional view of the groove 820 may correspond to a depth range of 0-3 millimeters.

The baffle shaft 830 may be mounted onto the motor part (also refers to the motor) 570. The baffle shaft 830 may be a part of the master blade 710. The baffle shaft 830 may be on the top or on the bottom of the master blade 710. The master blade 710 may rotate around the baffle shaft 830 in clockwise/counterclockwise direction. In some embodiments, when the master blade 710 stands up, it may correspond to the off-working state of the infrared filter part (also refers to the filter) 511. When the master blade 710 lays down, it may correspond to the working state of the infrared filter part (also refers to the filter) 511.

The connection shaft 840 may be connect with the drive rod 610 and be configured to drive the drive rod 610 to move when the master blade 710 is driven to rotate by the motor part (also refers to the motor) 570.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the optocoupler baffle 810 may be integrally or detachably connected with the limiting device 640. In this situation, the optocoupler baffle 810 may rotate synchronously with the limiting device 640. As another example, the optocoupler baffle 810 may be fixed to the lamp holder 510, and the optocoupler 590 may be integrally or detachably connected with the limiting device 640 or the baffle shaft 830. In this situation, the optocoupler 590 may rotate synchronously with the limiting device 640 or the baffle shaft 830.

Figure 9:
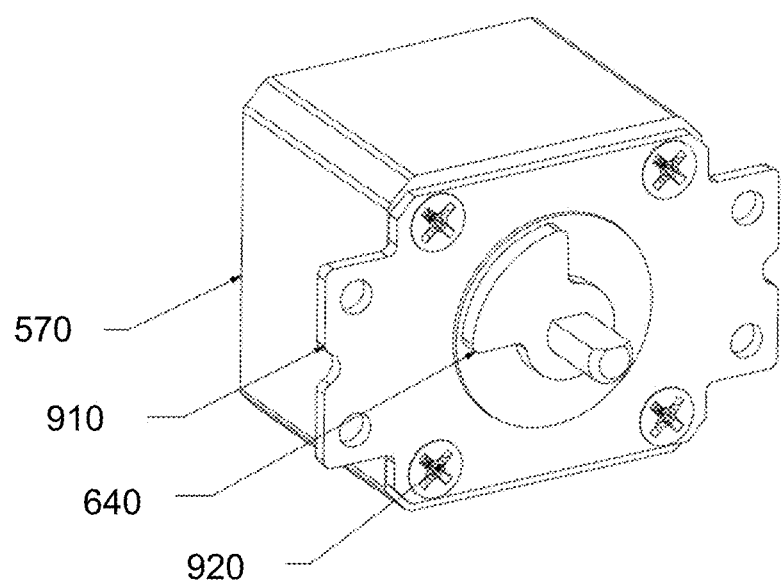
FIG. 9 is an exemplary view of a motor according to some embodiments of the present disclosure.

FIG. 9 illustrate an exemplary motor according to some embodiments of the present disclosure.

As shown in FIG. 9, the motor part (also refers to the motor) 570 may include a motor fixed plate 910 and a plurality of screws 920. On the motor fixed plate 910, a plurality of screws holes may be set. Part of the plurality of screws holes on the motor fixed plate 910 may cooperate with part the plurality of screws 920 to fix the motor on the motor fixed plate 910. The rest the plurality of screws holes on the motor fixed plate 910 may cooperate with the rest plurality of screws to connect it with the lamp holder 510. For example, the screws holes corresponding to four corners of the motor may be used to form a fastened connection between the motor and the motor fixed plate 910. The screws holes at the edge of the motor fixed plate 910 may be used to form a fastened connection between the motor fixed plate 910 and the lamp holder 510. Thus, the motor part (also refers to the motor) 570 may be fastened fixed on the lamp holder 510 through the motor fixed plate 910.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more grooves, instead of the motor fixed plate 910 and the plurality of screws 920, may be set on the motor part (also refers to the motor) 570 and the lamp holder 510 to form a fastened connection between the motor part (also refers to the motor) 570 and the lamp holder 510.

Figure 10:
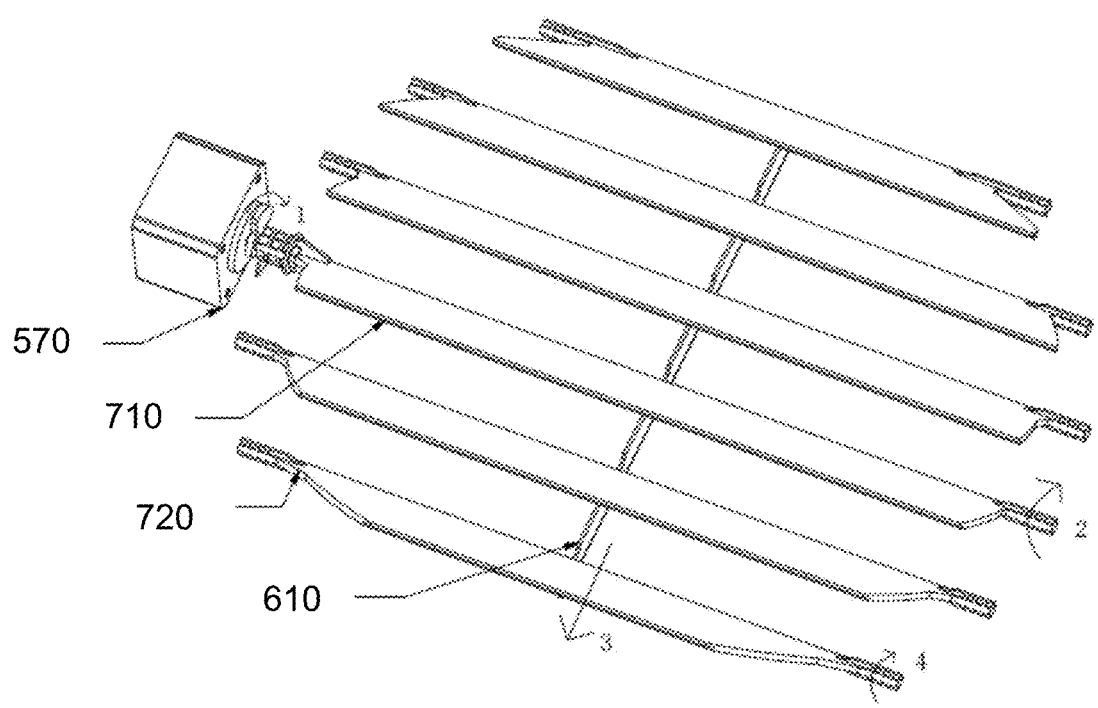
FIG. 10 is an exemplary view of an exemplary assembly of an infrared filter and a motor according to some embodiments of the present disclosure.

FIG. 10 illustrate an exemplary assembly of an infrared filter and a motor according to some embodiments of the present disclosure.

As shown in FIG. 10, the motor part (also refers to the motor) 570 may rotate in direction 1. Due to the connection between the motor part (also refers to the motor) 570 and the baffle shaft 830 through the groove 820, the master blade 710 may be driven to rotate in direction 2. For the connection between the master blade 710 and the drive rod 610 through the connection shaft 840, the drive rod 610 may be driven to move in direction 3. Further, the movement of the drive rod 610 may drive the slave blades 720 to rotate in direction 4. In some embodiments, the direction 1, the direction 2 and the direction 4 may be the same (e.g. a clockwise direction). The direction 3 may be a parallel direction along with the drive rod 610.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the motor part (also refers to the motor) 570 may rotate in clockwise direction. The master blade 710 and the slave blades 720 may be synchronously driven to rotate in clockwise direction.

Figure 11A:
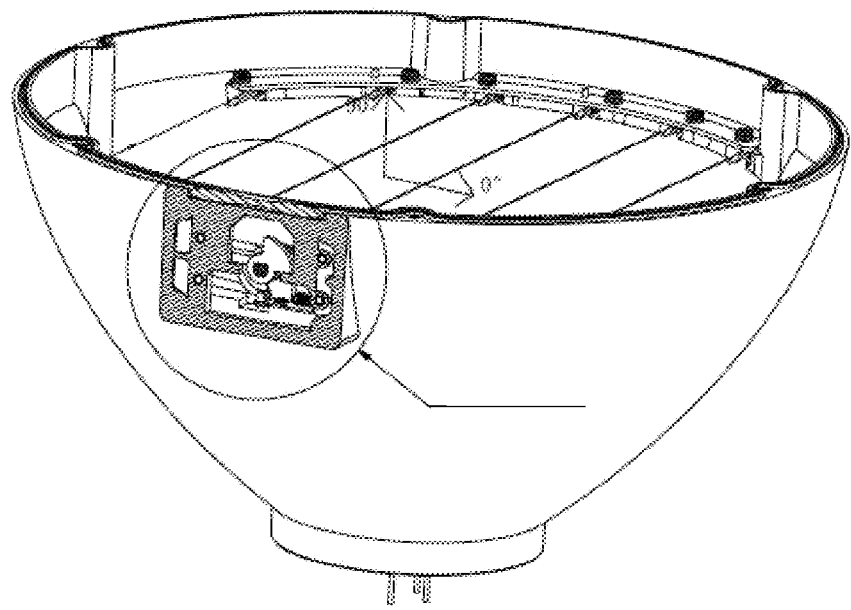
FIG. 11A is a side view of part of an exemplary lighting device according to some embodiments of the present disclosure.
Figure 11B:
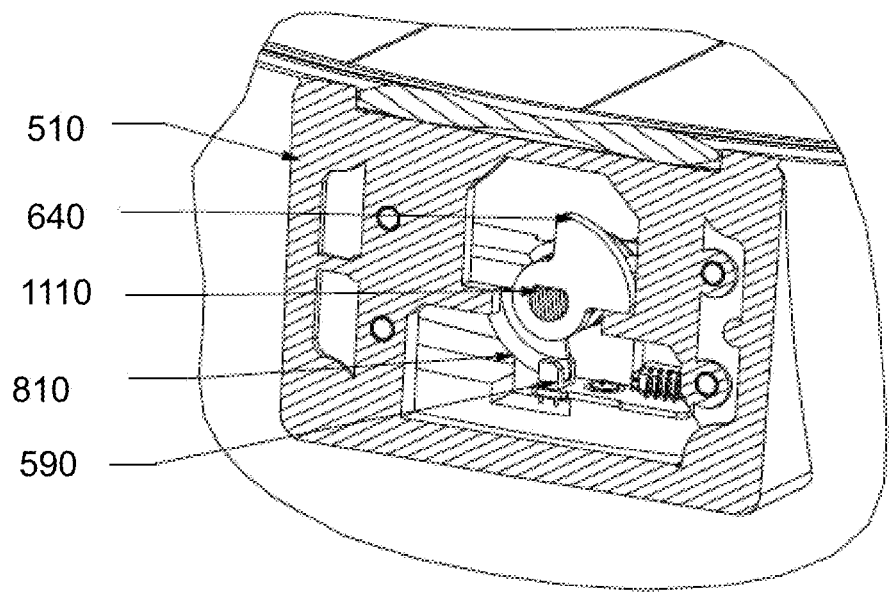
FIG. 11B is an enlarged side view of part of an exemplary lighting device according to some embodiments of the present disclosure.

FIG. 11A is a side view of part of an exemplary lighting device according to some embodiments of the present disclosure. FIG. 11B is an enlarged side view of part of an exemplary lighting device according to some embodiments of the present disclosure.

As shown in FIG. 11A, when the infrared filter part (also refers to the filter) 511 is on the working state, the blades (the master blade 710 and the slave blades 720) of the infrared filter part (also refers to the filter) 511 may lie down. In this situation, the light emitted by the lamp bead (also refers to the light source) 540 may be filtered. FIG. 11B shows position information of the limiting device 640 and optocoupler baffle 810, when the infrared filter part (also refers to the filter) 511 is on the working state. As shown in FIG. 11B, the limiting device 640 is rotate to the right. The optocoupler baffle 810 is in a position blocking the optocoupler signals.

Figure 12A:
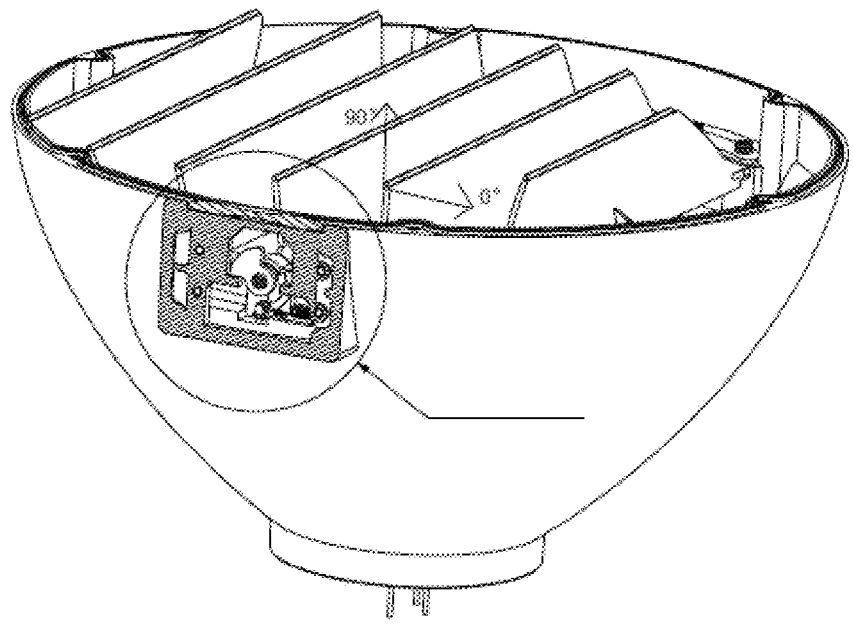
FIG. 12A is a side view of part of an exemplary lighting device according to some embodiments of the present disclosure.
Figure 12B:
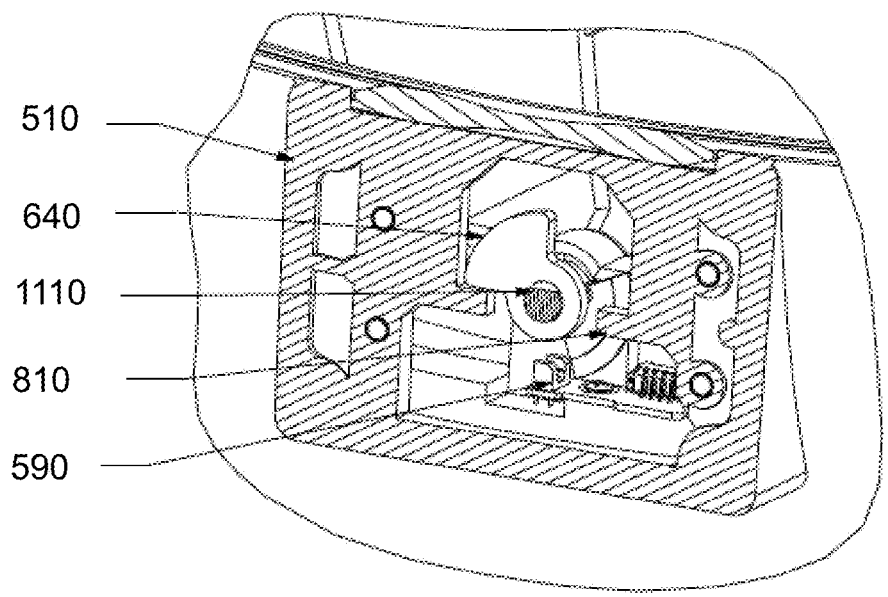
FIG. 12B is an enlarged side view of part of an exemplary lighting device according to some embodiments of the present disclosure.

FIG. 12A is a side view of part of an exemplary lighting device according to some embodiments of the present disclosure. FIG. 12B is an enlarged side view of part of an exemplary lighting device according to some embodiments of the present disclosure.

As shown in FIG. 12A, when the infrared filter part (also refers to the filter) 511 is on the off-working state, the blades (the master blade 710 and the slave blades 720) of the infrared filter part (also refers to the filter) 511 may stand up. In this situation, the light emitted by the lamp bead (also refers to the light source) 540 may be allowed to pass through. FIG. 11B shows position information of the limiting device 640 and optocoupler baffle 810, when the infrared filter part (also refers to the filter) 511 is on the off-working state. As shown in FIG. 11B, the limiting device 640 is rotate to the left. The optocoupler baffle 810 is in a position, in which the optocoupler signals may not be blocked.

In some embodiments, according to the determination of whether the optocoupler signals are blocked, an initial position of the blades may be determined. For example, in situation 1, the blades with a slant angle larger than 0 degree but smaller than 90 degree may be shown in FIGS. 11A and 11B. The optocoupler signals may be blocked by the optocoupler baffle 810. The processing device 130 may receive the state of the optocoupler 590 and may control the motor to rotate in counterclockwise direction until the optocoupler signals are not blocked by the optocoupler baffle 810 on a motor hinge 1110. Further, the processing device 130 may record the positions of the blades as initial positions. In situation 2, the blades with a slant angle larger than 90 degree may be shown in FIGS. 12A and 12B. The optocoupler signals may not be blocked by the optocoupler baffle 810. The processing device 130 may control the motor to rotate in clockwise direction at a certain angle, for example 30 degree, which may cause the optocoupler signals to be blocked. At this point, return to situation 1, the processing device 130 may further find and record the initial positions of the blades. After determine the initial positions of the blades, the rotation of the infrared filter part (also refers to the filter) 511 may be control by controlling the step angle of the stepper motor according to a determination of whether it is a daytime.

In some embodiments, the lighting device 120 may further include a photosensor. The photosensor may be used to detect ambient light around the lighting device 120. In some embodiments, the lighting device 120 may further include a processor in communication with the sensor and the driving components (also refers to the driving module). The processor may determine a light intensity of the ambient light that the photosensor detects. In response to a determination that the light intensity is greater than an intensity threshold, the processing device 130 may control the motor to remain at the initial position (the working state). In response to a determination that the light intensity is less than the intensity threshold, the processing device 130 may control the motor to rotate 90 degree from the initial position (the off-working state). After abnormal power-off restart, the device may determine the initial position according to the above method and then performs subsequent execution according to the information detected by the photosensor.

In some embodiments, the lighting device 120 may further include a timing control module. The timing control module may be configured to control time sequences for turning on or turning off the infrared part (also refers to the filter) 511. For example, the timing control module may turn on the infrared filter to the working state at every predetermined time (e.g., at 18:00 PM every day). As another example, the timing control module may turn off the infrared filter to the off-working state at every predetermined time (e.g., at 8:00 AM every day).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 13A:
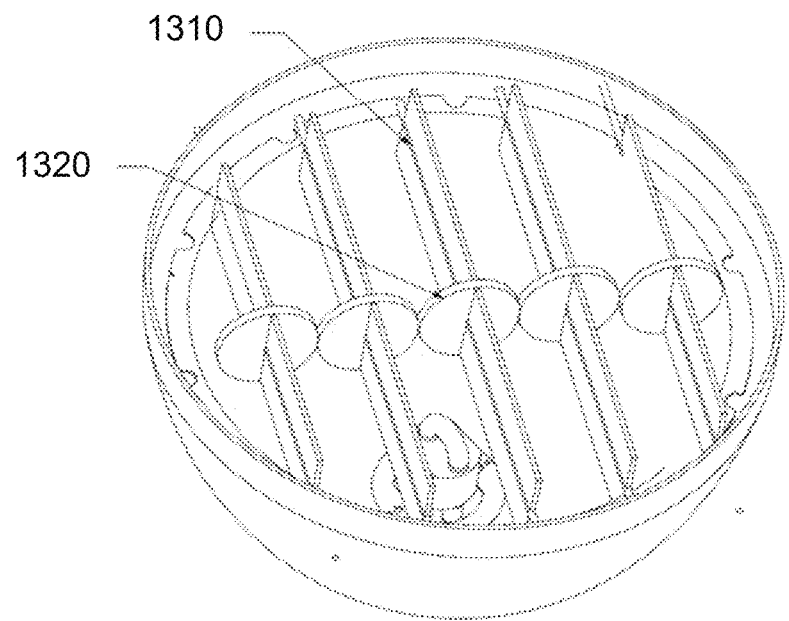
FIG. 13A is a top view of an exemplary infrared filter according to some embodiments of the present disclosure.
Figure 13B:
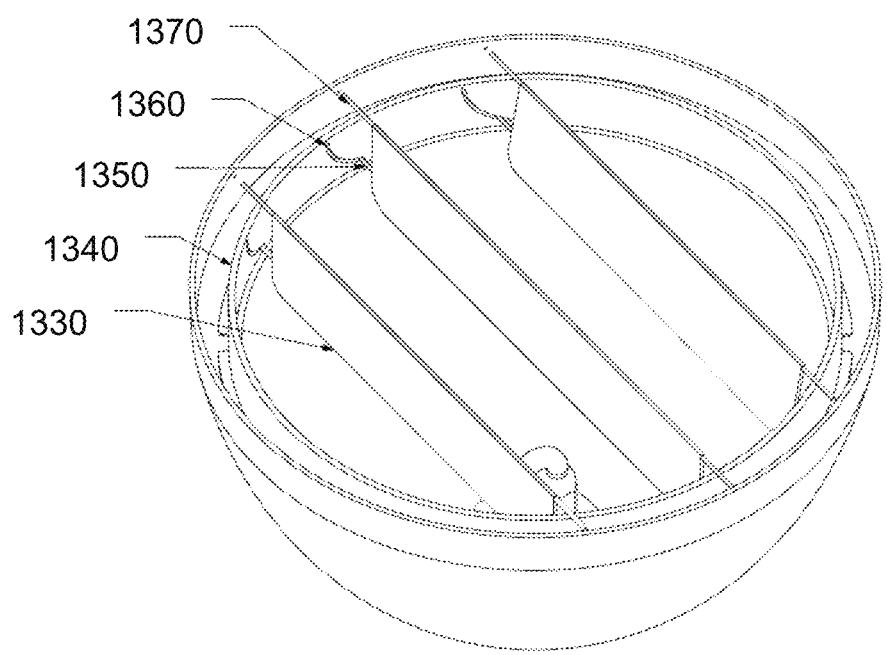
FIG. 13B is a top view of an exemplary infrared filter according to some embodiments of the present disclosure.

FIG. 13A is a top view of an exemplary infrared filter according to some embodiments of the present disclosure. FIG. 13B is a top view of an exemplary infrared filter according to some embodiments of the present disclosure.

As shown in 13A, the infrared filter part (also refers to the filter) 511 may include a plurality of blades. For example, the infrared filter part may include a master blade 1310 and one or more slave blades. The plurality of blades may be driven by the driving module such as a plurality of gears. Each of the plurality of gears may be mounted on each of the plurality of blades. The motor may drive the master blade 1310 to rotate at an angle via the gear corresponding to the master blade 1310. Through the gears of the blades, the one or more slave blades may synchronously be driven to rotate at the same angle.

As shown in 13B, the infrared filter part (also refers to the filter) 511 may include a plurality of blades 1330 and a rotating ring 1340. Each of the plurality of blades may include a drive stick 1350 and a baffle shaft 1370. The rotating ring 1340 may connect to the plurality of blades via a plurality of driving arcs 1360 (as the driving module). Each of the plurality of driving arcs 1360 may correspond to one drive stick 1350 of a blade. When the motor rotate, the rotating ring 1340 may be driven to rotate synchronously. Further, the drive stick 1350 may be driven to move along its corresponding driving arc 1360. When the driving arc 1360 is driven to a direction downward, the infrared filter part (also refers to the filter 511) may be on the off-working state to let the lighting device 120 to emit visible light. When the driving arc 1360 is driver to a direction upward (to a direction parallel to the baffle shaft 1370), the infrared filter part (also refers to the filter 511) may be on the working state to let the lighting device 120 to emit IR.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, a drive stick corresponding a driving arc may be set in a master blade. The slave blades may be driven by using a drive rod, which is connect with both the master blade and the slave blades.

Referring back to FIG. 1, the processing device 130 may obtain a first image under the visible light source that the lighting device 120 emits and a second image under the infrared light source that the lighting device 120 emits. In some embodiments, the first image may include color information, and the second image may include luminance information. In some embodiments, the processing device 130 may generate an enhanced image based on the first image and the second image. For example, the processing device 130 may fuse the color information in the first image and the luminance information in the second image to generate the enhanced image. In some embodiments, the enhanced image may be a color image with enhanced luminance. In this way, in a dark environment, such as at night or in a condition of backlight, elements in the captured image may be easy to be identified.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A lighting device for automatically switching between a visible light source and an infrared light source, comprising:
   a light source;
   an infrared filter; and
   a driving module for driving the infrared filter, wherein the infrared filter includes a plurality of blades, the driving module drivers at least one blade of the plurality of blades for automatically switching between the visible light source and the infrared light source, and the driving module includes a plurality of gears, each of the plurality of gears being mounted on each of the plurality of blades.

2. The lighting device of claim 1, wherein the driving module includes a rotating ring and a plurality of driving arcs, each of the plurality of driving arcs connecting the rotating ring to each of the plurality of blades.

3. The lighting device of claim 1, wherein the driving module includes a drive rod connecting to each of the plurality of blades.

4. The lighting device of claim 3, wherein one of the plurality of blades is a master blade and the lighting device further includes:

a motor for providing power to the driving module, the motor including a limiting device for limiting a rotation angle of the plurality of blades; and a groove connecting the motor to the master blade so that the motor and the master blade rotate synchronously.

5. The lighting device of claim 4 further comprising an optocoupler baffle on the master blade for determining a state of the infrared filter.

6. The lighting device of claim 5 further comprising:
a lamp holder;
a reflection cup;
an isolator mounted on the lamp holder for isolating the light source to the lamp holder and the reflection cup;
an optocoupler mounted below the master blade for determining a position of the optocoupler baffle;
two first pressing plates for fixing the infrared filter;
a first seal for sealing the motor;
a first cover plate for covering the motor;
a second seal for sealing the lamp holder; and
a second cover plate for covering the lamp holder, the second cover plate including a second pressing plate and a glass cover of the lamp holder.

7. The lighting device of claim 1 further comprising:
a photosensor for detecting ambient light around the lighting device.

8. The lighting device of claim 7, further comprising at least one processor in communication with the photosensor and the driving module, wherein the at least one processor is directed to:
determine a light intensity of the ambient light that the photosensor detects;
in response to a determination that the light intensity is greater than an intensity threshold, send a driving signal to the driving module for driving the infrared filter to a non-working state, wherein the lighting device emits visible light.

9. The lighting device of claim 8, wherein the at least one processor is further directed to:
in response to a determination that the light intensity is less than the intensity threshold, send a driving signal to the driving module for driving the infrared filter to a working state, wherein the lighting device emits infrared light.

10. The lighting device of claim 1 further comprising a timing control module for controlling time sequences for turning on or turning off the infrared filter.

11. An image capture system, comprising:
an image capture device;
a lighting device configured to automatically switch between a visible light source and an infrared light source of claim 1;
at least one storage device including a set of instructions;
at least one processor in communication with the at least one storage device, wherein when executing the set of instructions, the at least one processor is directed to cause the system to:
obtain a first image under the visible light source that the lighting device emits, wherein the first image includes color information;
obtain a second image under the infrared light source that the lighting device emits, wherein the second image includes luminance information; and
generate an enhanced image based on the first image and the second image.

12. The image capture system of claim 11, wherein the driving module includes a drive rod connecting to each of the plurality of blades.

13. The image capture system of claim 12, wherein one of the plurality of blades is a master blade and the lighting device further includes:
a motor for providing power to the driving module, the motor including a limiting device for limiting a rotation angle of the plurality of blades; and
a groove connecting the motor to the master blade so that the motor and the master blade rotate synchronously.

14. The image capture system of claim 13 further comprising an optocoupler baffle on the master blade for determining a state of the infrared filter.

15. The image capture system of claim 11 further comprising:
a photosensor for detecting ambient light around the lighting device.

* * * * *